W. D. McNAULL.
TIRE.
APPLICATION FILED MAR. 7, 1914.

1,147,032.

Patented July 20, 1915.

WITNESSES:
D. C. Watter
Gertrude Bracker.

INVENTOR:
William D. McNaull.
By Simon Hall, Atty.

UNITED STATES PATENT OFFICE.

WILLIAM D. McNAULL, OF TOLEDO, OHIO.

TIRE.

1,147,032. Specification of Letters Patent. Patented July 20, 1915.

Application filed March 7, 1914. Serial No. 823,059.

*To all whom it may concern:*

Be it known that I, WILLIAM D. McNAULL, a citizen of the United States, residing at Toledo, in the county of Lucas and State of Ohio, have invented certain new and useful Improvements in Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

In the tread-members of pneumatic tires for automobiles, as usually constructed, a number of layers of woven fabric, mixed with the india rubber of the tire, have their opposite margins folded around rods or cords or a bundle of wires which form the marginal beads of the tire tread-member. While this construction is, in a measure, satisfactory, it frequently happens that the fabric folded and vulcanized around the core of the bead becomes torn or loosened at some part of the circumference of the wheel, which mishap soon renders the tread-member of the tire useless.

My invention relates to and its object is to provide a construction which shall, in a great measure, if not entirely, overcome the difficulties and objections above indicated.

A further object of my invention is to provide an arrangement of inextensible marginal beads for my treads which not only furnishes a maximum of strength in proportion to the space occupied but so disposes the members of the beads that they insure the minimum of torsion and attrition of the beads upon the rims upon which they are mounted.

I accomplish this result by means of the construction and arrangement of parts hereinafter described, and shown and illustrated in the accompanying drawings, in which—

Figure 1:
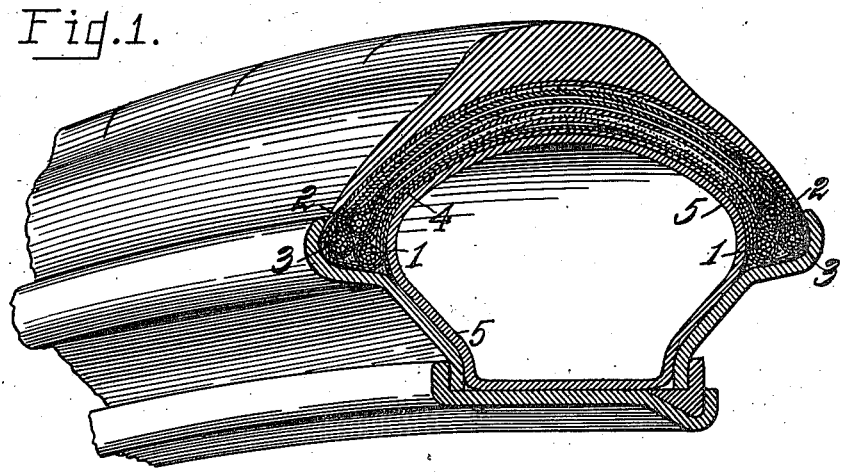
Figure 2:
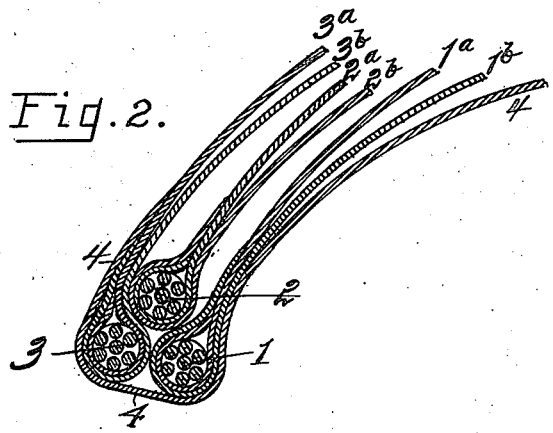

Figure 1, is a transverse sectional elevation of a portion of a tire embodying my improvement, and Fig. 2, a cross-sectional elevation of groups of wires forming the bead of a tire and showing the manner of disposing the several layers or bands of woven fabric employed in building up the tread-member of the tire.

Like numerals of reference indicate like parts in both views.

The construction of this device may most conveniently be described by explaining the manner of assembling the various parts. There are three groups of wires, numbered 1, 2 and 3 at each margin of the tire.

$1^a$ is a strip of fabric extending across the tire and having its margins folded around the groups 1.

$1^b$ is a like strip of fabric disposed in like manner and having its margins folded around the groups 1 and embracing also the bights or folds of the strip $1^a$.

$2^a$ and $2^b$ are strips of fabric extending across the width of the tire and having their margins folded around groups of wires 2.

$3^a$ and $3^b$ are strips of fabric disposed in relation to the tire and to the group of wires 3 in the same manner as above described with reference to groups 1 and 2. The groups of wires 1, 2 and 3 are now disposed in relation to each other in compact form, preferably in the triangular form illustrated in Fig. 2.

4 is a strip of fabric extending across the inner side of the tread-member of the tire and folded around and embracing the three groups of wires and having its margins folded onto and overlapping the outside groups of wires and their coverings.

It will be understood that the several groups of wires forming the beads together with the several layers of fabric are mingled with and overlaid by vulcanized india rubber in the usual manner, which is well understood and which,—forming no part of this invention,—need not be here further described.

Should the outer layers of fabric be ruptured and their hold upon either of the groups of wires 3 be destroyed, it will be seen that the next succeeding layers of fabric and their hold upon the beads of the tire will remain unaffected and that even if all the layers of the fabric except those which embrace the group of wires 1 were loosened or torn, the inner layers $1^a$—$1^b$ and the group of wires 1 would remain intact, and that the inner pneumatic tube 5 would still be fully protected.

While the numbers of wires and groups of wires and strips of fabric illustrated in the drawing are found to be satisfactory, I do not, of course, limit my invention to any definite number of either of these parts, as their numbers may be varied as circumstances may require. Neither do I limit my invention to "groups of wires" alone for forming the cores of the marginal beads, since manifestly their equivalents will readily suggest themselves.

Having described my invention, what I claim and desire to secure by Letters Patent, is—

1. In the tread-member of a tire, a pair of beads, each bead consisting of a group of three triangularly disposed inextensible cables, and a series of superposed strips of fabric in the opposite margins of which said respective cables are separately folded.

2. In the tread-member of a tire, a pair of beads, each bead consisting of a group of three triangularly disposed inextensible cables and a series of circumferential bands of fabric extending across said tread-member and in the opposite margins of which said cables are respectively separately folded, combined with an additonal strip of fabric in the opposite margins of which said groups of cables and their wrappings are folded.

In testimony whereof I affix my signature in presence of two witnesses.

WILLIAM D. McNAULL.

Witnesses:
EDWARD G. KERLY,
GERTRUDE BRACKER.